(12) United States Patent
Van Vliet et al.

(10) Patent No.: US 11,420,179 B2
(45) Date of Patent: Aug. 23, 2022

(54) PROPULSION ELEMENT INCLUDING A CATALYZING REACTOR

(71) Applicant: Nederlandse Organisatie voor toegepast-natuurwetenschappelijk onderzoek TNO, s-Gravenhage (NL)

(72) Inventors: Laurens Daniël Van Vliet, 's-Gravenhage (NL); Michiel Hannes Straathof, 's-Gravenhage (NL); Jeichienus Johannes Van Der Werff, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 387 days.

(21) Appl. No.: 16/775,535

(22) Filed: Jan. 29, 2020

(65) Prior Publication Data

US 2020/0164333 A1   May 28, 2020

Related U.S. Application Data (62) Division of application No. 15/329,819, filed as application No. PCT/NL2015/050547 on Jul. 24, 2015, now abandoned.

(30) Foreign Application Priority Data

Jul. 29, 2014   (EP) ..................... 14178972

(51) Int. Cl.
*B01J 19/24* (2006.01)
*B01J 19/00* (2006.01)
(Continued)

(52) U.S. Cl.
CPC .......... *B01J 19/2485* (2013.01); *B01D 53/94* (2013.01); *B01J 19/0013* (2013.01);
(Continued)

(58) Field of Classification Search
CPC combination set(s) only.
See application file for complete search history.

(56) References Cited

U.S. PATENT DOCUMENTS 3,407,604 A * 10/1968 Keith ................. F02K 9/68
                                                    502/332
6,773,684 B2   8/2004 Lesieur et al.
(Continued)

FOREIGN PATENT DOCUMENTS

DE   19936675 A1   7/2001
EP   0171786 A2   2/1986
(Continued)

OTHER PUBLICATIONS

Oct. 9, 2015—International Search Report and Written Opinion of PCT/NL2015/050547.

*Primary Examiner* — Lessanework Seifu
(74) *Attorney, Agent, or Firm* — Banner & Witcoff, Ltd.

(57) ABSTRACT

A propulsion element including a catalyzing reactor is disclosed. The catalyzing reactor comprises a reactor entrance and a reactor exit and an internal structure arranged for flowing a reacting medium through the reactor from the reactor entrance to the reactor exit. The reactor structure comprising at least one thin walled reactor channel arranged between the entrance and the exit of the reactor. The channel having a channel wall that includes a catalyst and that defines a flow path, in which channel in use, a catalyzed exothermic reaction takes place in the medium as it flows along the flow path. The at least one channel is looped to have a portion of its flow path that is downstream with respect to the reactor entrance in heat exchanging contact with a portion of a flow path that is that is more upstream with respect to the reactor entrance, so as to transfer heat between a downstream portion of the reacting medium to an upstream portion thereof.

20 Claims, 4 Drawing Sheets

(51) Int. Cl.
  *B01D 53/94* (2006.01)
  *B01J 23/50* (2006.01)
  *B01J 35/04* (2006.01)
  *F01N 3/24* (2006.01)
  *F02K 9/95* (2006.01)

(52) U.S. Cl.
  CPC ............. *B01J 19/243* (2013.01); *B01J 23/50* (2013.01); *B01J 35/04* (2013.01); *F01N 3/24* (2013.01); *F02K 9/95* (2013.01); *B01D 2255/90* (2013.01); *B01J 2219/00159* (2013.01); *B01J 2219/2402* (2013.01); *B01J 2219/2403* (2013.01); *B01J 2219/2406* (2013.01); *B01J 2219/2409* (2013.01); *B01J 2219/2413* (2013.01); *B01J 2219/2428* (2013.01); *F05D 2220/80* (2013.01)

(56) References Cited

U.S. PATENT DOCUMENTS

| | | |
|---|---|---|
| 8,992,850 B2 | 3/2015 | Vanderwees |
| 2004/0175323 A1 | 9/2004 | Franz et al. |

FOREIGN PATENT DOCUMENTS

| | | |
|---|---|---|
| EP | 0575883 A1 | 12/1993 |
| EP | 1454877 A1 | 9/2004 |
| EP | 2522624 A1 | 11/2012 |
| WO | 2013008020 A1 | 1/2013 |

\* cited by examiner

PROPULSION ELEMENT INCLUDING A CATALYZING REACTOR

CROSS-REFERENCE TO RELATED APPLICATIONS

This application is a divisional of U.S. application Ser. No. 15/329,819, filed Jan. 27, 2017, which is a U.S. National Stage application under 35 U.S.C. § 371 of International Application PCT/NL2015/050547 (published as WO 2016/018146 A1), filed Jul. 24, 2015, which claims the benefit of priority to EP 14178972.7, filed Jul. 29, 2014. Each of these prior applications is hereby incorporated by reference in its entirety.

FIELD OF THE INVENTION

Embodiments of the invention relate to a propulsion element including a catalyzing reactor, in particular a fixed bed catalyzing reactor, a method for producing such a reactor and a use of a reactor.

DESCRIPTION OF RELATED ART

Catalyzing reactors are generally known and are e.g. used to control vehicle exhaust emissions or as thrusters in space propulsion. When configured as a so called fixed bed catalyzing reactor, these reactors usually comprise a reactor entrance and a reactor exit and an internal structure having a bundle of reactor channels of which the channel wall includes a catalyst, and arranged for flowing a reacting medium through the reactor from the reactor entrance to the reactor exit.

A disadvantage of the catalyzing reactors known in the prior art is that they typically need to be preheated or pre-pulsed to heat up the reactor sufficiently to be effective. Commonly, a medium flows through the channels and will interact with the catalyst. For example, in the automobile industry, a catalyzing reactor may be used to decompose toxic pollutants in exhaust gas. Usually, the catalyst has an operation temperature such as in between 300-850 degrees Celsius. Therefore, it takes some time before the desired operating temperature of the catalyst is reached, and until then the vehicle emits relatively large amount of toxic gasses because the catalyzing reactor has not yet been warmed up sufficiently to be effective.

Furthermore, in space crafts, catalyzing reactors are often part of the propulsion system, or an attitude control system, to decompose a propellant to create thrust. Also, in some cases, catalyzing fixed bed reactors are used in igniters of rocket motors. An example is the case where Rocket Grade Hydrogen Peroxide (RGHP) is converted into superheated oxygen gas and water vapor by means of a catalyst. Commonly, a stack of woven silver screens, or a packed bed of (spherical) particles is used as a catalyzing reactor. These "silver beds" are capable of fully decomposing high mass flows of RGHP through reactor channels formed by subsequent screen apertures. However, these catalyzing reactors also need to be preheated or pre-pulsed, and therefore there is a delay in the start of the trust or special means are necessary. Especially, in spacecraft attitude control where small pulses of thrust may be required, incomplete decomposition will lead to inefficient use of the propellant and a significant delay in the thrust is inacceptable for attitude control. To encounter this, such catalyzing reactors are usually accompanied by an external electrical heating element e.g. heating coils for preheating and controlling the temperature of the catalyzing reactor. This external electrical heating element, however, requires relatively large amount of energy, and adds weight and complexity to the propulsion system. Another disadvantage is that screens or packed beds may be packed differently every time and thus these reactors are difficult to model and reproduce.

SUMMARY OF THE INVENTION

The invention aims at alleviating one or more of the aforementioned disadvantages.

An object of the invention is to provide a catalyzing reactor having an improved cold start performance. In particular, it is an object of the invention to provide a catalyzing reactor that can be operated without a external electrical heating element and/or does not require to be pre-pulsed. Additionally, a further object of the invention is to provide a catalyzing reactor which is relatively easy to model and reproduce.

To that end, the invention provides for a catalyzing reactor comprising a reactor entrance and a reactor exit and an internal structure arranged for flowing a reacting medium through the reactor from the reactor entrance to the reactor exit, the reactor structure comprising at least one thin walled reactor channel arranged between the entrance and the exit of the reactor, the channel having a channel wall that includes a catalyst and that defines a flow path, in which channel in use, a catalyzed reaction takes place in the medium as it flows along the flow path, the at least one channel being looped to have a portion of its flow path that is downstream with respect to the reactor entrance in heat exchanging contact with a portion of a flow path that is more upstream with respect to the reactor entrance, so as to transfer heat between a downstream portion of the reacting medium to an upstream portion thereof.

The upstream portion of the flow path of the channel may have a lower temperature as compared to the downstream portion of the flow path, and heat may then be fed upstream. When the medium is flowing along the flow path in the channel through the reactor, interaction of the catalyst with the medium can take place such that a catalyzed reaction, preferably a exothermic chemical and/or physical reaction, may occur within the channel. Along the flow path of the medium the temperature in the channel may, in use, increase gradually as a result of this exothermal process. However, in the upstream portion of the flow path, for example, near an inlet of the channel, the medium may not yet fully react via the catalyst because the desired operating temperature, wherein interaction of the catalyst with the medium may fully occur, has not yet been reached.

In particular, by looping the downstream portion of the flow path of the channel, the released heat in the downstream portion of the reacting medium may be transferred to the more upstream portion thereof. Therefore, the downstream portion of the flow path may exchange its released heat to the more upstream portion of the flow path and thus the temperature in the more upstream portion of the flow path may be increased and controlled to a temperature level wherein the medium can fully react via the catalyst and thus a preheating element and/or pre-pulses may not be required.

Alternatively, the upstream portion of the flow path of the channel may have a higher temperature as compared to a downstream portion of the flow path, and heat may then be fed downstream. This may e.g. be the case when hot exhaust gas flowing through a channel of the catalyzer during start-up is cooled down due to the heat capacity of the catalyzer. By looping the channel to have a portion of its flow path that is downstream with respect to the reactor entrance in heat exchanging contact with a portion of a flow path that is more upstream with respect to the reactor entrance, the medium in the downstream portion may be reheated to some degree, so as to increase the reaction intensity.

The channel may be looped to be in direct heat exchanging contact with itself or with adjacent channels. In particular, the downstream portion may via direct heat exchanging contact short-circuit heat exchange compared to indirect conductive heat transfer along the wall of an intermediate portion of the channel.

The channel wall may be thin relative to the minimum diameter and/or width and/or the minimum length of the channel. For example, in a thin walled channel as claimed, the ratio of the wall thickness to the diameter of the channel may range between 0.03-0.25, preferably between 0.01-0.05 and more preferably less than 0.01. The ratio of the wall thickness to the length of the channel may range between 0.001-0.01, preferably less than 0.001 and more preferably less than 0.0001. The wall thickness of a thin walled channel as claimed may be less than a few millimeters for larger reactor structures, e.g. less than 5 mm. For smaller structures, it may e.g. be less than 1 mm, and e.g. less than 0.3 mm. Further, the length of the channel may extend from the entrance of the reactor to the exit of the reactor along a longitudinal axis of the reactor.

The downstream portion of the flow path may be looped, and preferably loops back, such that the downstream portion of the flow path may share a common relative thin channel wall with the upstream portion of itself or with adjacent channels to transfer heat. The channel may then e.g. have a spiraling, U-shaped, S-shaped, N-shaped or meandering configuration. The channel may then comprise one or more loops. The channel may thus extend from the entrance of the reactor to the exit of the reactor to include a flow path portion that is transverse to the longitudinal axis of the reactor. The channel may also extend from the entrance of the reactor to the exit of the reactor having a zigzag flow path transverse to the longitudinal axis of the reactor.

The channel may have one or more reversed sections for looping the channel back onto itself and/or onto a channel wall of adjacent channels. The reversed section is generally curved, preferably as a loop, with an angle smaller then 180° and preferable the reversed section has an angle of about 180° and more preferably the reversed section is formed as an U-shaped section. The reversed section may have an U-shaped form with sharp rectangular angles for creating a turbulent flow of the medium to further improve the heat exchanging contact. Further, turbulators may be arranged on the inside of the channel e.g. on the channel wall to create a turbulent flow of the medium to increase the heat transfer performance. The channel may also have a spiraling and/or meandering flow path wherein the channel comprises one or more reversed sections in which the reversed sections have relatively sharp and/or wide bends e.g. double S-bends.

It may also be possible that the downstream portion of the flow path is looped such that it does not share a common thin channel wall but that the downstream portion of the flow path may be in indirect heat exchanging contact with the upstream portion of the flow path via an intermediate structure, e.g. a plate or a fin.

Further, it is also possible that the channel has a helical or spiral coiled configuration. The channel may then be configured to have a helical or spiral flow path from the entrance to the exit of the reactor. At least one channel of a bundle of channels may then extend helically and/or spirally from the entrance to the exit of the reactor wherein at least one other channel of the bundle of channels may extend from the entrance to the exit within the helical or spiral channel, such that released heat within the helical or spiral channel may be transferred to the other, preferably, straight running channels. Preferably, the downstream portion of the helical flow path may be in heat exchanging contact with the upstream portion of the flow path of the channels that are running through the helical and/or spiral.

Further, the channel wall may have a porous structure to improve the heat transfer exchanging performance between the downstream portion of the flow path and its upstream portion. In particular, the channel may share a thin channel wall with itself and/or with another channel of the bundle of channels, wherein the channel wall may have a degree of porosity. A porous structure of the wall may comprise, for example, small pores such that a part of the flow through the channel, e.g. 0.1-10%, may pass through the channel wall between the upstream and downstream portions.

The reactor may be shaped as a cylinder, however it may also have an ellipsoid or polygonal shape, e.g. rectangular, triangle or hexagonal. Preferably, the internal structure of the reactor is monolithic and comprises at least one thin walled reactor channel. The catalytic reactor with a complex internal geometry may preferably be manufactured by additive layer manufacturing, e.g. laser sintering technique or 3D printing without the need for molds. The reactor may, for example, be made by adding successive layers of material e.g. paper, powder, sheets or liquid material to each other under computer control to build the reactor from a series of cross sections. These subsequent layers may then bonded together, for example, glued or fused to create the reactor. The computer may typically use a 3D image file of the reactor that is sliced to obtain the cross sections that form the layers.

Additive layer manufacturing not only allows the forming of complex geometries, it also allows the forming of thin walled channels that are sufficiently fluid tight.

It is noted that the additive layer manufacturing includes not only laser sintering techniques, but also, for example, laminated object manufacturing or fused deposition modelling.

When the reactor may be manufactured by fused deposition modeling, thermoplastics or metal wire may be used to be heated to their melting temperature. The melted material may then be guided through an extrusion head such as a nozzle. The reactor may then be formed by extruding small amounts of the melted material to form layers as the melted material may harden after being extruded from the extrusion head.

Further it is also possible, for example, to use laminated object manufacturing wherein the reactor may be formed by gluing layers of material onto each other that are cut to shape with a knife or laser cutter.

The internal structure may have at least one channel and preferably a bundle of channels that may be formed as a honeycomb. The channels may have varying cross section and/or curved and/or looped sections, and the channels may extend parallel or non-parallel to each other from the reactor entrance to the reactor exit. Therefore, the internal structure of the reactor may be relatively difficult to be manufactured with conventional forming manufacturing processes e.g. extrusion.

The entrance and the exit of the reactor may be in mutually spaced apart planes. Preferably, the entrance of the reactor may be arranged at a first side of the reactor and the exit of the reactor is arranged at the opposite side of the entrance. However, it is also possible that the entrance and the exit are arranged in the same plane and/or around the circumference of the reactor. Further, the inlet and/or outlet of the channels may be arranged on the same plane as the entrance and/or exit of the reactor respectively. It is, however, noted that it is also possible that the inlet and/or outlet may be arranged in a different plane than the entrance and/or exit respectively. For example, the inlet of the channel can be arranged in a plane that is behind or in front of the plane of the reactor entrance. Further, the outlet of the channel can be arranged in a plane that is in front of or behind the plane of the reactor exit.

The channel in the reactor, or at least one of multiple channels in the reactor, may have a substantially constant cross section or cross sectional surface along its flow path. Optionally, the channel, or at least one of multiple channels, may have a varying cross section along its flow path, and particularly, the channel may diverge and/or converge along its flow path. For example, the cross sectional surface of the channel may increase along a first part of its flow path, e.g. a first section and/or upstream portion, and may decrease along a second part of the flow path, e.g. a second section and/or downstream portion, or vice versa. In embodiments, the cross sectional surface of the channel may change substantially continuously along its flow path, e.g. continuously along multiple sections of a meandering channel, such as a substantially S-shaped channel. In the context of this description, a substantially continuous change of cross sectional surface can be understood as a change of cross sectional surface that is free of step-wise increments. In embodiments, said cross sectional surface may increase substantially continuously along the flow path of the channel. Alternatively, the cross-sectional surface may decrease substantially continuously along the flow path of the channel. In embodiments, the substantially continuously varying cross sectional surface of the flow path, which for instance can be continuously converging or continuously diverging, can continuously gradually change, e.g. increase or decrease, along its flow path. The varying cross section of the channel may control the flow velocity and/or the pressure drop of the medium along the flow path in the channel. For example, by applying convergent and/or divergent sections to the channel along the flow path, the flow velocity and/or pressure drop may be optimized. Further, the channels may have a cross section which may be circular, ellipsoid or polygonal e.g. triangular, square, rectangular, diamond-shaped or hexagonal. Further, adjacent channels may be arranged together such that they form a cross section that may have a polygonal shape e.g. a triangular, square, rectangular, diamond, or hexagonal shape.

In embodiments, the catalyzing reactor can comprise a bundle of channels. The channels, at least part of which can be looped, can be placed substantially parallel to each other. Preferably, a substantially straight and/or non-looped channel can have outer wall sides that are substantially parallel to each other, such that multiple channels can relatively easily be stacked into a bundle having substantially parallel outer sides, i.e. a bundle which is not substantially converging or diverging. Additionally or alternatively, a looped channel may be of such design that its channel sections together form a substantially tube-shaped structure, e.g. a hexagonal structure, having outer sides that are substantially parallel to each other. Hence, such looped channels may be provided in a stacked configuration together with one or more correspondingly formed looped channels and/or with one or more substantially straight and/or non-looped channels having outer wall sides being substantially parallel to each other.

Although the cross sectional surface of a looped channel may be diverging or converging along its looped flow path, the channel's wall or walls facing adjacent, substantially parallel, channels can be substantially parallel to said adjacent channel and/or its outer walls. It is noted that two adjacent channels share a common wall, e.g. integrally forming the outer walls of said two adjacent channels, for instance when the channels are formed by means of a 3D-printing technique.

The channel wall may be made from a heat conducting material, preferably metal or a heat conducting material comprising metal. If sufficiently thin walled, it may alternatively also be made of a material with lesser heat conducting properties, e.g. ceramics. Further, the channel and/or channel wall and/or reactor may preferably be made from a catalytic material comprising one or more metals e.g. silver, aluminum, barium, copper, platinum or palladium or an inert material e.g. alumina, silica, silicon nitride, silicon carbine, carbon and mixtures thereof, but also ceramics. Furthermore, the catalytic material may comprise a zeolite. It is, however, also possible that the channel and/or reactor, and in particular, the channel wall may be made from a non-catalytic material and coated with a catalytic material to provide for a catalyst. The non-catalytic material may comprise one or more inert materials e.g. alumina, silica, silicon nitride, silicon carbine, carbon and mixtures thereof. It is also possible to use ceramic as a catalyst support with a catalytic material coated thereon.

The catalytic reactor may be part of a propulsion system as a propulsion element, and preferably the catalytic reactor may be formed as a thruster of the propulsion system, a part of a thruster, or an igniter in space propulsion. The reactor can then be used to decompose a medium, e.g. into its reaction products. The medium can preferably be a liquid or gaseous medium, such as a liquid or gaseous propellant. For example, the reactor may be used to decompose a mono and/or bi-propellant into its reaction products. The reactor may decompose rocket grade hydrogen peroxide into super heated oxygen gas and water vapor. Particularly, the reactor can be used to, for example, decompose 100 g/s of hydrogen peroxide into super heated oxygen gas and water vapor. It is also possible that the reactor is not a thruster or an igniter, but used for other purposes wherein a catalyst is required. For example, the catalytic reactor may also be used in a catalyzer as part of an exhaust system for petrol engines. The catalytic reactor is then used to convert toxic pollutants in exhaust gas. The reactor may then be embodied such that heat of the toxic pollutant in the upstream portion of the flow path may be transferred to its downstream portion via direct heat exchanging contact.

The invention further relates to a use of a catalytic reactor as a propulsion element such as a thruster or an igniter for rocket engines with an improved cold start performance wherein a preheating element may not be required to warm the reactor sufficiently to be effective.

Further, the invention relates to a method for catalyzing a medium in a catalyzing reactor, wherein the medium flows through the reactor along a flow path in a channel for catalyzation with a catalyst, wherein the flow path has a reversed portion such that heat in the channel is transferred between a downstream portion of the flow flowing through the flow path and an upstream portion thereof.

Further, the invention also relates to a method for producing a catalytic reactor. The manufacturing process is adding successive layers of materials onto each other. This manufacturing process is also known as for example, 3D printing, layer manufacturing, constructive manufacturing, generative manufacturing and selective laser melting. First, a thin layer of material, such as powder, may be applied onto a bed, preferably with a roller. Then a high power laser may be applied to fuse or bound the layer of material in cross section. By lowering the powered bed a new layer of powdered material may be applied onto the bed. These steps can be repeated. The powdered material is a powdered catalyst or catalyst support material. When a catalyst support is used for the catalyzing reactor, the channel wall may be coated with a catalyst.

BRIEF DESCRIPTION OF THE DRAWINGS

The invention will be further elucidated on the basis of an exemplary embodiment which is represented in a drawing. In the drawing.

It is noted that the figures are merely schematic representations of a preferred embodiment of the invention, which is given here by way of non-limiting exemplary embodiment. In the description, the same or similar part and elements have the same or similar reference signs.

DETAILED DESCRIPTION

Figure 1:
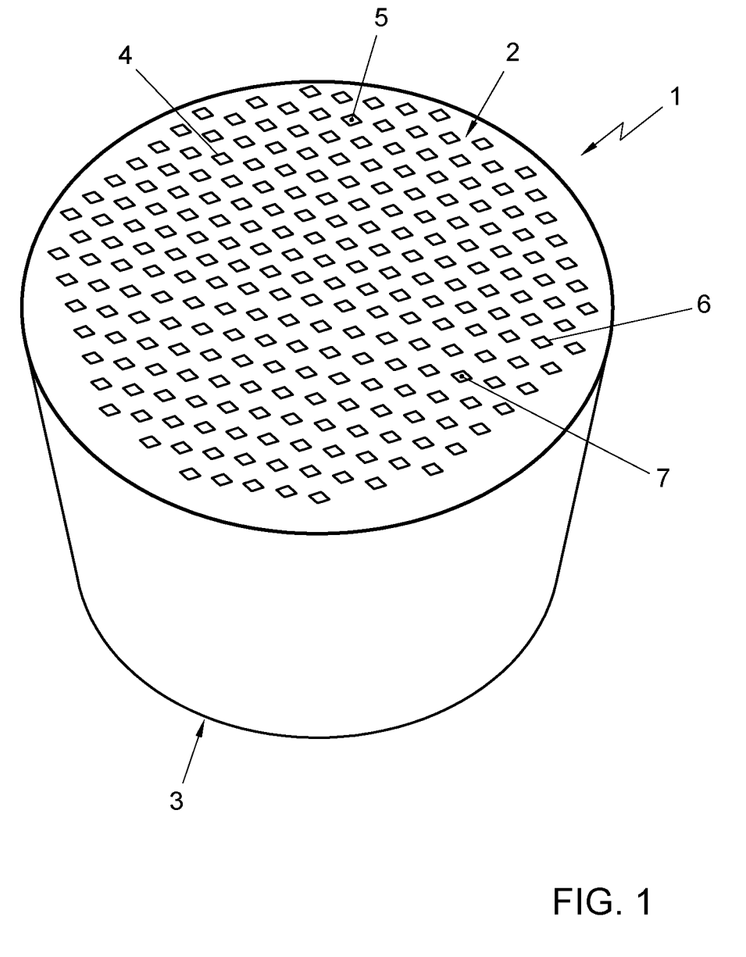
FIG. 1 shows a catalytic reactor.
Figure 2:
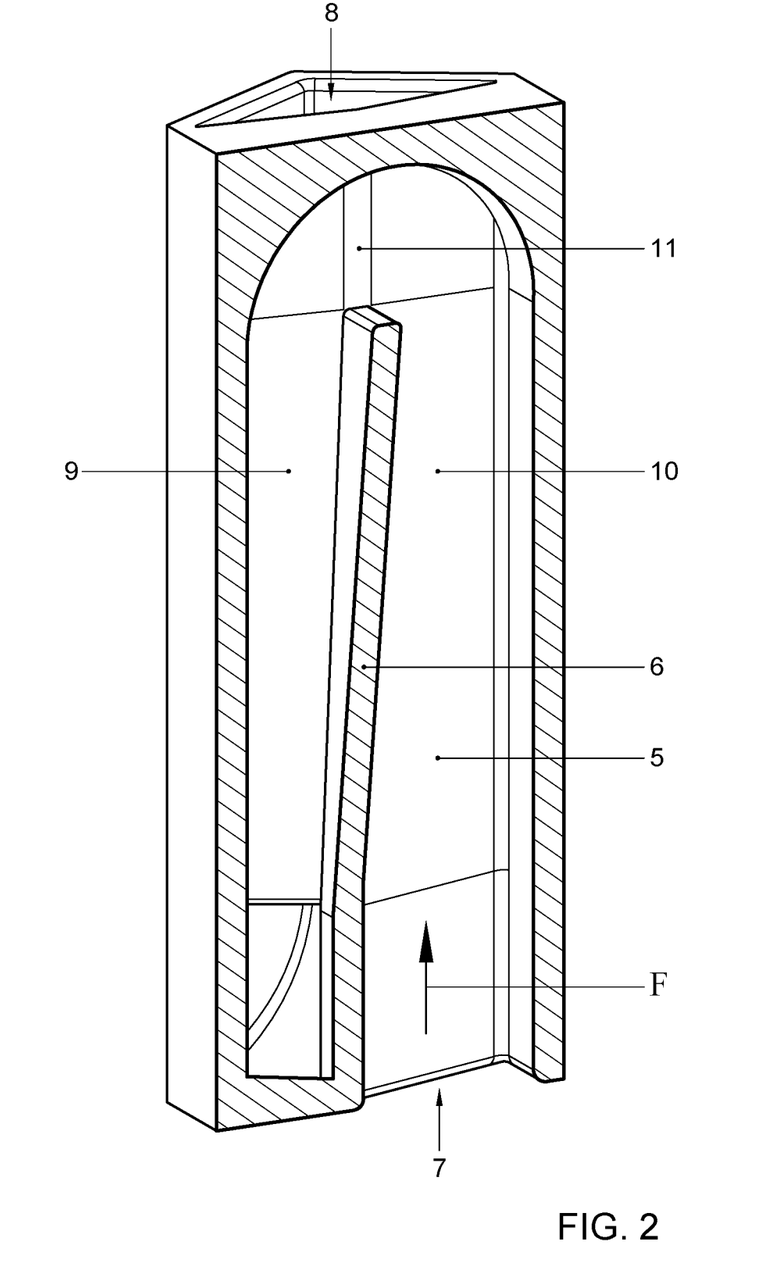
FIG. 2 shows a cutaway of one of the channels of the catalytic reactor of FIG. 1.

In FIG. 1 a catalyzing reactor 1 is shown. The reactor 1 is in this exemplary embodiment shown as a cylinder. However, other shapes are also possible such as a triangle, ellipsoid or rectangular. The reactor 1 may have a reactor entrance 2 and a reactor exit 3 and an internal structure 4 wherein a reacting medium can flow through the reactor 1 from the reactor entrance 2 to the reactor exit 3. The reactor structure 4 may comprise at least one reactor channel 5 with a relative thin channel wall 6 in comparison with the diameter, minimum width and/or minimum length of the reactor channel 5. Preferably, as shown in FIG. 1, the internal structure 4 may, for example, be designed as a honeycomb structure with a bundle of thin-walled heat conducting channels 5. The channels 5 can be arranged between the entrance 2 and the exit 3 of the reactor 1. The channels 5 may have a channel wall 6 that is made from a catalytic material or a non-catalytic support material and then coated with a catalytic material. In FIG. 2 a cutaway of one of the channel 5 of the reactor 1 is shown. The channel 5 may have a thin channel wall 6 and an inlet 7 and outlet 8 in which a medium can flow. When in use, the medium may flow through these plurality of channels 5 and the medium may react via the catalytic material on the inside of the channels 5, in particular, via the catalyst arranged on the channel wall 6 and thus a catalyzed exothermal reaction may take place inside the channels 5 as the medium flows along the flow path F from the entrance 2 to the exit 3 of the reactor 1. Due to the exothermic reaction, heat may be released on the inside of the channel 5 along the flow path F where more heat may be released on a portion of the flow path that is more downstream with respect the reactor entrance 2.

Figure 3:
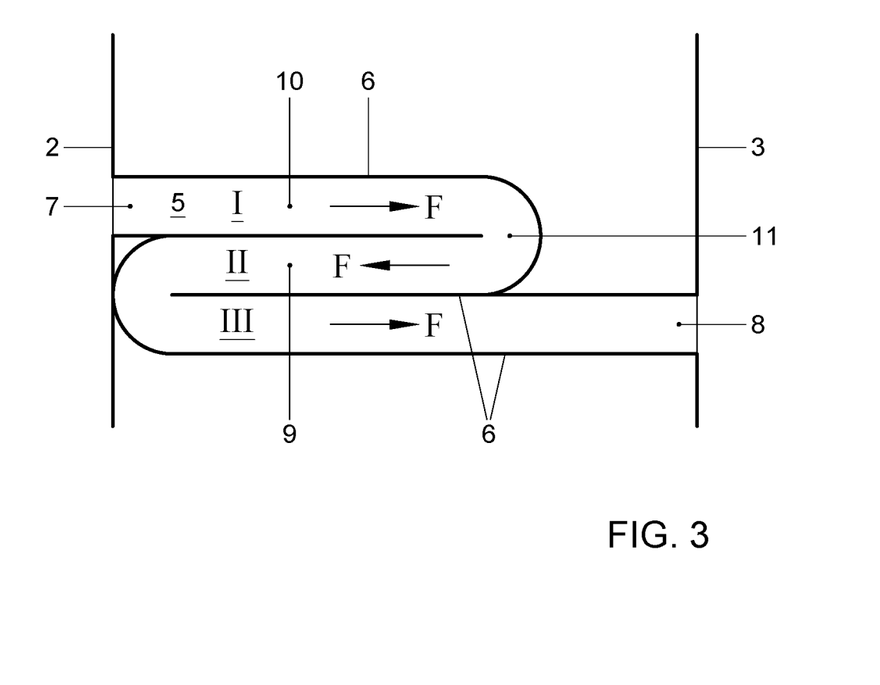
FIG. 3 shows a cross section of the channel of the catalytic reactor of FIG. 1.

FIGS. 2-3 show that one or more channels 5 may be looped along its flow path F of the channel 5 for looping the channel 5 back and/or in other directions, for example, downwards, upwards and/or sideward. The channel 5 may be looped onto itself or the channel 5 may be looped onto adjacent channels. Furthermore, in FIG. 2 is shown that a looped channel 5 may be of such design that its channel sections together form a substantially tube-shaped structure, e.g. a hexagonal structure, having outer sides that are substantially parallel to each other. Hence, such looped channels 5 may be provided in a stacked configuration together with one or more correspondingly formed looped channels and/or with one or more substantially straight and/or non-looped channels having outer wall sides being substantially parallel to each other. The channel wall of the channel 5 facing adjacent channel (not shown) is substantially parallel to the adjacent channel. The two adjacent channels share a common wall, e.g. integrally forming the outer walls of said two adjacent channels, for instance when the channels are formed by means of a 3D-printing technique.

Further, it is shown that the cross sectional surface of the channel 5 is decreasing continuously from the inlet 7 to the outlet 8, but it is noted that it is also possible that the cross sectional surface of the channel 5 is increasing continuously from the inlet 7 to the outlet 8.

Preferably, the channel 5 may be looped at a portion of the flow path where there is more released heat, due to the exothermic reaction, as compared to a portion of the flow path where there is less released heat. More preferably, a more downstream portion 9 of the flow path F with respect the reactor entrance 2 may be looped such that the more downstream portion 9 with respect to the reactor entrance 2 is in direct heat transferring contact with the portion of the flow path that is more upstream 10 with respect to the reactor entrance 2. The released heat of the reacting medium in the more downstream portion 9 may then be fed to the more upstream portion 10 thereof.

Figure 4:
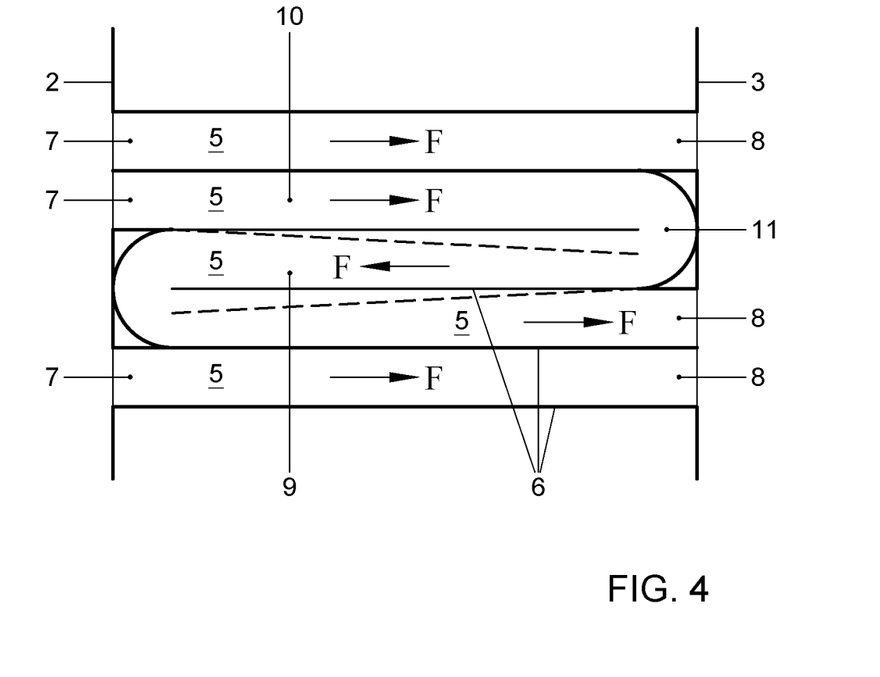
FIG. 4 shows a cross section of the channel according to a second embodiment of the catalytic reactor.

Additionally, the downstream portion 9 of the flow path F may be looped back such that the downstream portion 9 shares a common thin wall 6 with its more upstream portion 10 or with the channel wall 6 of other channels 5 of the bundle of channels, as shown in FIG. 4. Released heat in the more downstream portion 9 of the flow path may then be looped back such that this heat may be in heat exchanging contact with the more upstream portion 10 thereof via the thin-wall 6.

In FIG. 3 is shown that in this exemplary embodiment, due to its looping, the flow path F of the medium may be divided in three sections I, II, and III. In this example, section I may be the upstream portion of the flow path F as compared to the more downstream portion 9 of the flow path F in section II. Further, section II may be the more upstream portion 10 of the flow path in comparison with the more downstream portion 9 of the flow path F in section III. Released heat in section III may be transferred to section II via the channel wall 6 and released heat in section II may be transferred to section I via its channel wall 6. By looping the more downstream portion 9 of the flow path F such that heat may be fed to the more upstream portion 10 of the flow path, the catalytic reactor may have an improved cold start performance in comparison with, for example, a catalytic reactor without a loop.

The honeycomb structure 4 of the reactor 1 may comprise a bundle of channels, and the channel of the bundle of channels may share a common thin wall 6 with an adjacent channel of the bundle of channels and/or share a common thin wall 6 with itself. The channels 5 may each be looped but in FIG. 4 is shown that the channels 5 may also be looped alternately with adjacent channels 5.

To have a loop in the channel 5, the channel 5 may have one or more reversed section 11 for looping the channel 5, and preferably for looping the channel 5 back onto itself and/or other channels. The reversed section 11 may for example be shaped as an U-shaped section but may also have a meandering flow path F. Further, the channel wall 6 may have a degree of porosity to improve the heat exchange between the downstream portion 9 of the flow path F of the channel 5 to the upstream portion 10 of the flow path F of the same channel 5 and/or adjacent channels 5. Specifically, the wall 6 between the channels 5 may be made thin such that they may become partially porous and the medium may pass the wall 6 in a balanced way, so heat transfer upstream may be optimized.

As shown in FIG. 1 of this exemplary embodiment the entrance 2 and the exit 3 of the reactor 1 are in mutually spaced apart planes. Preferably, the entrance 2 of the reactor may be arranged at a plane of the reactor 1 where the medium enters the reactor 1 and the exit 3 of the reactor is arranged on an opposite plane of the reactor where the medium may leave the reactor. Preferably, the channel 5 may extend substantially along the longitudinal axis X of the reactor from the entrance 2 to the exit 3.

Along the flow path F of the medium, the channel 5 may have varying cross section, such as a convergent and/or divergent section such that the flow velocity and the pressure within the channel can be controlled. Additionally, the channel may have a hexagonal, triangular, rectangular, ellipsoid or any polygonal cross section, which may vary in shape along the length of the channel 5. The channel may be e.g. divergent and/or convergent. For example, the cross sectional surface of the channel 5 may change substantially continuously along the flow path F, or at least along a part of its flow path.

Further, a bundle of channels 5 may be stacked together to form an polygonal cross section e.g. hexagonal shaped cross section.

As indicated with dashed lines in FIG. 4, by looping the channel 5 such that the flow may travel the length of the reactor e.g. three times, it may be possible that the channel diverge and/or converge without increasing the cross section of the bundle of channels. This way, more bundle of channels can be stacked into the cylinder shaped reactor, thus increasing the efficiency of the reactor.

Figure 5:
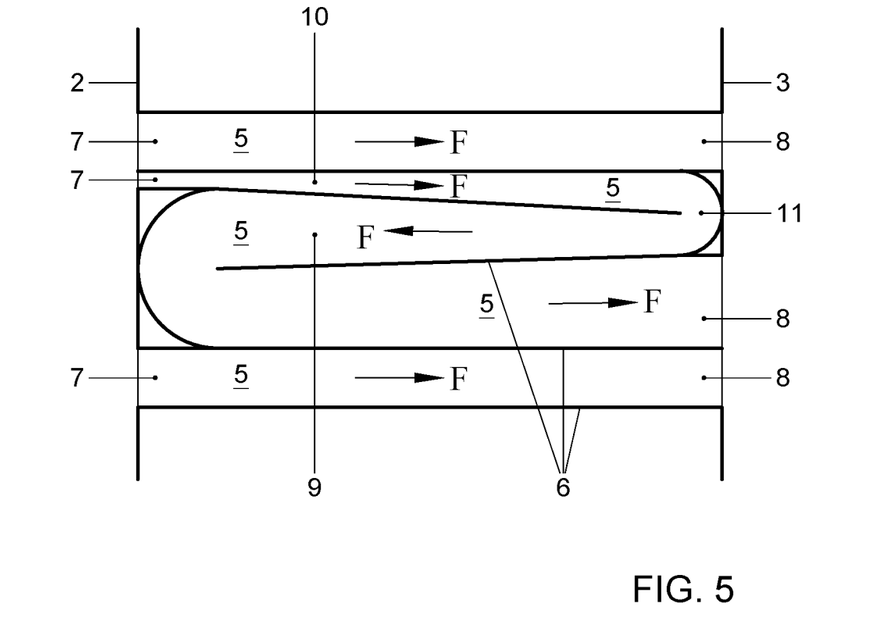
FIG. 5 shows a cross section of the channel according to an embodiment of the catalytic reactor.

In FIG. 5 is shown that the channel 5 having the reversed section 11 has a continuously increasing cross sectional surface along its flow path F from the inlet 7 to the outlet 8. The channel wall 6 of the channel 5 having the reversed section 11, facing towards the adjacent channel shares a common channel wall 6 with the adjacent channel.

When the medium is flowing through the channel 5, a heterogeneous catalytic reaction may occur between the medium flowing through the channel 5 and the catalyst arranged on the channel wall 6. The reactor 1 may be used as a thruster or an igniter with an improved cold start performance, and the medium flowing through the channel 5 is a fluid preferably a liquid medium such as hydrogen peroxide. The reactor 1 may then decompose a mass flow of hydrogen peroxide into water and superheated gaseous medium such as superheated oxygen gas. Alternatively or additionally, other propellants may be used.

Especially in case the catalyzing reactor 1 is used as thruster, the entrance 2 and the exit 3 of the reactor 1 may be in a mutually space apart plane while preserving the complex internal reactor structure 4 of reciprocating channels 5.

Further, due to the complex internal structure 4 of the reactor 1, the reactor is preferably made by a manufacturing process wherein successive layers of material are added to each other to form the reactor 1.

The catalytic reactor may be used as a thruster having an improved cold start performance in space propulsion. The catalytic reactor may decompose a medium, preferably a gaseous or liquid medium, into an accelerated superheated gas to provide for thrust for a spacecraft.

The catalytic reactor with its complex internal structure may relatively easily and inexpensively be manufactured using an additive layer method, e.g. 3D printing or laser sintering. Using an additive layer method, a complex internal structure can be made, for example, a honeycomb structure with thin walled reciprocating channels which are also leak tight or porous such that the reacting medium cannot escape from the channel. Preferably, a heat conducting catalytic material is used, for example, silver. The powder used for the production of the reactor may comprise some additives for improving the 3D printing process or optimizing the i.e. mechanical characteristics of the reactor, e.g. an amount of copper. However, the presence of copper or another support material that is mixed with silver may affect the efficiency of the catalyzing reactor. In such a case, an additional coating process step may be applied to improve the performance of the bed. The reactor is produced under computer control. The computer uses a 3D image file to obtain the cross sections of reactor. The reactor is produced by first applying a thin layer of powdered material onto a bed. Then a high power laser is applied in two dimensions, to fuse the layer of powdered material according to a predetermined pattern. The powdered bed is then lowered and a new layer of powdered material is applied onto bed and the laser radiation is applied again to fuse a new layer such that a three dimensional object can be formed. The powdered material is a powdered catalyst or a powdered catalyst support material. When the powdered material is not a catalyst but a catalyst support material, optionally a catalytic material may be applied to the shaped object. Another advantage of this process method is that control over the production of the reactors by additive manufacturing enables more reproducible reactors.

As for the purpose of this disclosure, it is pointed out that technical features which have been described may be susceptible of functional generalization. It is further pointed out that—insofar as not explicitly mentioned—such technical features can be considered separately from the context of the given exemplary embodiment, and can further be considered separately from the technical features with which they cooperate in the context of the example.

It is pointed out that the invention is not limited to the exemplary embodiment represented here, and that many variants are possible.

For example, the channels within the reactor may extend along the longitudinal axis of the reactor. However, in alternative embodiments of the catalyzing reactor, the channels may also extend along a transverse axis of the reactor. Further, the flow path may be spiral or helical. It is further noted that it is also possible that the reaction that takes place in the channel may not be exothermal. In that case the upstream portion of the flow path may transfer heat to the downstream portion of the flow path. Particularly, heat may be redistributed over the reactor during non-stationary and/or stationary functioning. Such variants will be clear to the skilled person, and are considered to be within the scope of the invention as defined in the appended claims.

What is claimed is:

1. A propulsion element including a catalyzing reactor, the catalyzing reactor having a reactor entrance, a reactor exit, and an internal structure configured for flowing a reacting medium from the reactor entrance to the reactor exit, the internal structure comprising at least one reactor channel having a channel wall that includes a catalyst for catalyzing a reaction of the reacting medium, wherein the reactor channel defines a flow path between the reactor entrance and the reactor exit, and wherein the reactor channel is looped such that a first portion of the flow path that is relatively more downstream with respect to the reactor entrance is proximate, and in heat exchanging contact with, a second portion of the flow path that is relatively more upstream with respect to the reactor entrance, the reactor channel being configured for transferring heat between the reacting medium present in the first portion of the flow path and the reacting medium present in the second portion of the flow path.

2. The propulsion element of claim 1, wherein a ratio of a thickness of the channel wall to a minimum inner diameter of the reactor channel is less than 0.05.

3. The propulsion element of claim 2, wherein the ratio of the thickness of the channel wall to the minimum inner diameter of the reactor channel is between 0.01 and 0.05.

4. The propulsion element of claim 2, wherein the ratio of the thickness of the channel wall to the minimum inner diameter of the reactor channel is less than 0.01.

5. The propulsion element of claim 1, wherein a ratio of a thickness of the channel wall to a length of the channel is less than 0.001.

6. The propulsion element of claim 5, wherein the ratio of the thickness of the channel wall to the length of the channel is less than 0.0001.

7. The propulsion element of claim 1, wherein the channel wall is shared between the first portion of the flow path that is relatively more downstream with respect to the reactor entrance and the second portion of the flow path that is relatively more upstream with respect to the reactor entrance.

8. The propulsion element of claim 1, wherein the internal structure comprises a bundle of reactor channels, wherein each reactor channel of the bundle defines a respective flow path between the reactor entrance and the reactor exit.

9. The propulsion element of claim 8, wherein the respective flow paths of the reactor channels are not in fluid communication with each other.

10. The propulsion element of claim 8, wherein each respective flow path has a respective, relatively more downstream portion and a respective, relatively more upstream portion, wherein each respective, relatively more downstream portion of the flow path shares a common wall with (i) the respective, relatively more upstream portion of the flow path, (ii) an adjacent reactor channel of the bundle of reactor channels, or (iii) both (i) and (ii).

11. The propulsion element of claim 10, wherein each respective, relatively more downstream portion of the flow path shares a common wall with the respective, relatively more upstream portion of the flow path.

12. The propulsion element of claim 1, wherein the reactor channel has at least one reversed section for looping the reactor channel back onto itself and/or at least one other reactor channel of a bundle of reactor channels of the internal structure.

13. The propulsion element of claim 12, wherein the at least one reversed section is part of a U-shaped form, an N-shaped form, or an S-shaped form.

14. The propulsion element of claim 1, wherein the reactor channel has, at an entrance end, an entrance cross section in a plane of the reactor entrance and has, at an exit end, an exit cross section in a plane of the reactor exit, said plane of the reactor exit being spaced apart from said plane of the reactor entrance.

15. The propulsion element of claim 1, wherein the reactor channel has a varying cross section along the flow path.

16. The propulsion element of claim 1, wherein the channel wall is made from a heat conducting catalytic material.

17. The propulsion element of claim 1, wherein the propulsion element is part of a thruster and/or an igniter and is configured to decompose the reacting medium into reaction products including an accelerated superheated gas to provide thrust.

18. The propulsion element of claim 17, wherein the thruster and/or the igniter is a component of a spacecraft.

19. The propulsion element of claim 1, wherein the catalyzing reactor is formed by adding successive layers of material to each other.

20. The propulsion element of claim 1, wherein the reacting medium is a liquid or a gaseous propellant.

* * * * *